US009002880B2

(12) United States Patent
Park et al.

(10) Patent No.: US 9,002,880 B2
(45) Date of Patent: Apr. 7, 2015

(54) APPARATUS FOR SEARCHING FOR INFORMATION WITHIN SPACE OF INTEREST

(71) Applicant: Hyundai Motor Company, Seoul (KR)

(72) Inventors: Cheol-Woo Park, Seoul (KR);
Soon-Sung Kwon, Gyeonggi-do (KR);
Hong-Hoi Kim, Daejeon (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/167,209

(22) Filed: Jan. 29, 2014

(65) Prior Publication Data

US 2014/0149396 A1 May 29, 2014

Related U.S. Application Data

(63) Continuation-in-part of application No. 13/618,330, filed on Sep. 14, 2012, now abandoned, and a continuation-in-part of application No. 13/320,649, filed as application No. PCT/KR2010/003055 on Nov. 15, 2011, now abandoned.

(60) Provisional application No. 61/599,189, filed on Feb. 15, 2012.

(30) Foreign Application Priority Data

May 15, 2009 (KR) .................. 10-2009-0042401
Feb. 1, 2013 (KR) .................. 10-2013-0011919

(51) Int. Cl.
*G06F 7/00* (2006.01)
*G06F 17/30* (2006.01)

(52) U.S. Cl.
CPC .................. *G06F 17/3087* (2013.01)

(58) Field of Classification Search
CPC ............. G06F 17/30424; G06F 17/30477; G06F 17/30241; G06F 17/30864; G06F 17/30277
See application file for complete search history.

(56) References Cited

U.S. PATENT DOCUMENTS 7,305,396 B2 * 12/2007 Schmidt et al. .................. 1/1
7,376,636 B1 * 5/2008 Wang et al. .................. 707/694
(Continued)

FOREIGN PATENT DOCUMENTS

KR   10-2004-0028076      4/2004
KR      100484223 B1      4/2005
(Continued)

OTHER PUBLICATIONS

International Search Report dated Dec. 7, 2010 in connection with PCT/KR2010/003055, with English translation.
(Continued)

*Primary Examiner* — Robert Beausoliel, Jr.
*Assistant Examiner* — Nicholas Allen
(74) *Attorney, Agent, or Firm* — Mintz Levin Cohn Ferris Glovsky and Popeo, P.C.; Peter F. Corless (57) ABSTRACT

An apparatus for searching for a space object SOI. The apparatus includes a Space Of Interest (SOI) data base (DB) including a plurality of space object SOIs and relationship objects, a search input unit configured to receive at least one of the plurality of space object SOIs and a search word from a user, a relationship display unit configured to output at least one relationship object with respect to the received at least one space object SOI, a relationship selection unit configured to receive a selection for a portion of the output relationship objects from the user, a search processing unit configured to perform searching on the SOI DB based on the selected relationship object, the received space object SOI, and a search word, and a search output unit configured to output a searching result for the searching. The relationship object indicates a relationship, which has been previously defined on the SOI DB, between the received space object SOI and a space object SOI related to the received space object SOI among the plurality of space object SOIs.

11 Claims, 12 Drawing Sheets

(56) References Cited

U.S. PATENT DOCUMENTS

| | | |
|---|---|---|
| 2003/0061211 A1 | 3/2003 | Shultz et al. |
| 2004/0068433 A1 | 4/2004 | Chatterjee et al. |
| 2004/0204839 A1* | 10/2004 | Imanishi ................. 701/209 |
| 2004/0236504 A1* | 11/2004 | Bickford et al. ........... 701/207 |
| 2004/0243306 A1* | 12/2004 | Han ......................... 701/211 |
| 2005/0171686 A1* | 8/2005 | Davis ....................... 701/200 |
| 2005/0251331 A1* | 11/2005 | Kreft ........................ 701/207 |
| 2006/0064346 A1 | 3/2006 | Steenstra et al. |
| 2006/0238383 A1* | 10/2006 | Kimchi et al. ............ 340/995.1 |
| 2007/0008181 A1* | 1/2007 | Rollert et al. ............. 340/932.2 |
| 2007/0230770 A1* | 10/2007 | Kulkarni et al. ........... 382/149 |
| 2008/0288104 A1 | 11/2008 | Shani |
| 2008/0294332 A1* | 11/2008 | Levanon et al. ........... 701/200 |
| 2009/0005968 A1* | 1/2009 | Vengroff et al. ........... 701/202 |
| 2009/0012953 A1* | 1/2009 | Chu et al. ....................... 707/5 |
| 2009/0012955 A1* | 1/2009 | Chu et al. ....................... 707/5 |
| 2009/0069030 A1* | 3/2009 | Bozionek et al. .......... 455/456.1 |
| 2009/0070293 A1* | 3/2009 | Vechersky .................... 707/3 |
| 2009/0132469 A1* | 5/2009 | White et al. ................... 707/2 |
| 2009/0191899 A1* | 7/2009 | Wilson et al. ............. 455/456.3 |
| 2009/0192703 A1* | 7/2009 | Hess et al. .................. 701/200 |
| 2009/0198767 A1* | 8/2009 | Jakobson et al. ........... 709/203 |
| 2009/0216732 A1* | 8/2009 | Feng ........................... 707/4 |
| 2009/0234847 A1* | 9/2009 | Homma et al. ................ 707/5 |
| 2009/0234877 A1* | 9/2009 | Vogel et al. ................. 707/102 |
| 2009/0265340 A1* | 10/2009 | Barcklay et al. ................ 707/5 |
| 2009/0315776 A1* | 12/2009 | Khosravy et al. ........... 342/452 |
| 2009/0327071 A1* | 12/2009 | Kreft ........................ 705/14.49 |
| 2009/0327078 A1 | 12/2009 | Ohazama et al. |
| 2010/0004004 A1* | 1/2010 | Browne-Swinburne et al. ............................ 455/457 |
| 2010/0013931 A1* | 1/2010 | Golan et al. ................ 348/150 |
| 2010/0082242 A1* | 4/2010 | Park ........................... 701/208 |
| 2010/0106400 A1* | 4/2010 | Park et al. .................. 701/201 |
| 2010/0118025 A1* | 5/2010 | Smith et al. ................ 345/418 |
| 2011/0010376 A1* | 1/2011 | Kawauchi .................. 707/758 |
| 2011/0093458 A1* | 4/2011 | Zheng et al. ............... 707/724 |
| 2012/0072448 A1* | 3/2012 | Kwon et al. ................ 707/769 |
| 2013/0066880 A1* | 3/2013 | Schramm et al. ........... 707/743 |

FOREIGN PATENT DOCUMENTS

| | | |
|---|---|---|
| KR | 10-0610226 | 8/2006 |
| KR | 10-2008-0034272 | 4/2008 |
| KR | 10-2009-0012838 A | 2/2009 |
| KR | 10-2009-0044361 | 5/2009 |
| KR | 10-1039414 B1 | 6/2011 |
| WO | 2010-006062 A1 | 1/2010 |

OTHER PUBLICATIONS

Notice of Allowance dated May 18, 2012 in connection with Korean Application No. 10-2009-042401.

* cited by examiner

Fig.11B

APPARATUS FOR SEARCHING FOR INFORMATION WITHIN SPACE OF INTEREST

CROSS-REFERENCE TO RELATED APPLICATION

This application is a continuation-in-part of U.S. patent application Ser. No. 13/618,330, filed Sep. 14, 2012 now published as U.S. Patent Application Publication No. US 2013-0132427, which claims priority under 35 U.S.C. §119 (e) to U.S. Provisional Patent Application Ser. No. 61/599,189, filed Feb. 15, 2012, which also is a continuation-in-part under 35 U.S.C. §120 of U.S. patent application Ser. No. 13/320,649, now published as U.S. Patent Application Publication No. US 2013-0013635, filed Nov. 15, 2011, which is a national phase application under 35 U.S.C. §371 of International Application No. PCT/KR2010/003055, filed May 14, 2010, which claim priority to Korean Patent Application No. 10-2009-0042401, filed May 15, 2009, and Korean Patent Application No. 10-2013-0011919, filed Feb. 1, 2013. The entire content of each of the above-referenced patent applications is hereby is incorporated by reference herein.

BACKGROUND OF THE INVENTION

1. Field of the Invention

The present invention relates to an apparatus for searching for information within Space of Interest (hereinafter referred to as an 'SOI') and, more particularly, to an apparatus for searching for position information, which is capable of precisely searching for several pieces of information, etc. within an SOI by limiting the SOI.

2. Background of the Invention

In general, technology for setting coordinates X/Y in a specific point included in map information and providing data matched with the set coordinates is used in a conventional apparatus for searching for position information. The specific point refers to a firm or shop name or a name which may become the subject of interest of a user. The set coordinates are connected to Point Of Interest (hereinafter referred to as a 'POI') information, thus providing data desired by the user.

Figure 1:
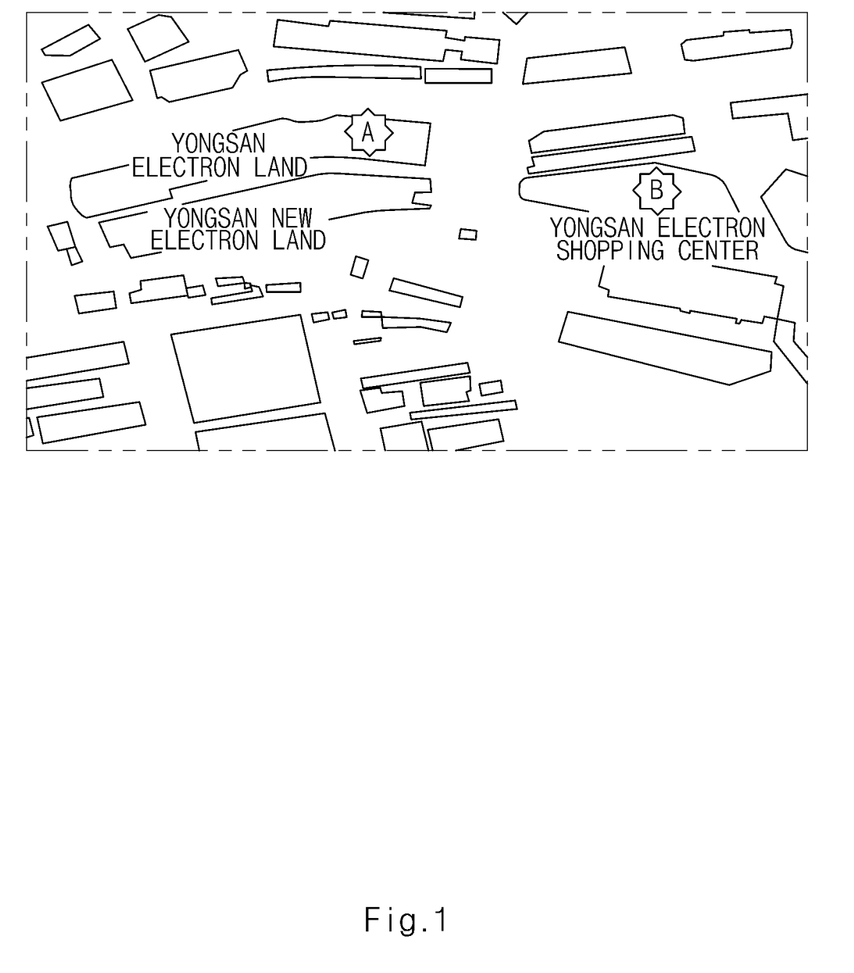
FIG. 1 is a diagram showing a conventional method of searching for position information.

FIG. 1 is a diagram showing a conventional method of searching for position information. The conventional method is described in short with reference to FIG. 1.

For example, a user may search for a game machine store placed within an electron land. In this case, the user may enter a search word "Electron Land Game Machine". In this case, however, as shown in FIG. 1, not only a game machine store A placed within the electron land, but also a game machine store B not placed within the electron land is provided as the result of the search.

This is because in the conventional method, when position information is searched for, only the X/Y coordinates of a POI are displayed in a map and only a name or category similar to a keyword entered by a user is searched for. Accordingly, the conventional method is problematic in that the result of the search is not correct because all the stores, such as Yongsan Electron Shopping Center which has a keyword similar to a game machine and which is adjacent to Yongsan Electron Land, are outputted although the user has wanted to search for a store related to the game machine within Yongsan Electron Land. In other words, the conventional method is problematic in that a condition that "the store desired by the user is placed only within the electron land" is not satisfied.

BRIEF SUMMARY OF THE INVENTION

An embodiment of the present invention is directed to providing an apparatus for searching for position information, which is capable of precisely searching for information within an accurate SOI object desired by a user.

Furthermore, an embodiment of the present invention is directed to solving the limitation of a POI search in which a range of space desired by a user cannot be arbitrarily designated because the present invention is not based on a POI represented by only simple X/Y coordinate points and the present invention targets an SOI object including a space concept having a specific area form.

Furthermore, an embodiment of the present invention is directed to setting a search range based on relationship between objects and specifying a database corresponding to a user's desired search range in an entire data base, thereby increasing accuracy of a searching result and searching efficiency.

In accordance with an aspect of the present invention, there is provided an apparatus for searching for position information comprising a Space Of Interest (SOI) data base (DB) including a plurality of space object SOIs and relationship objects; a search input unit configured to receive at least one of the plurality of space object SOIs and a search word from a user; a relationship display unit configured to output at least one relationship object with respect to the received at least one space object SOI; a relationship selection unit configured to receive a selection for a portion of the output relationship objects from the user; a search processing unit configured to perform searching on the SOI DB based on the selected relationship object, the received space object SOI, and a search word; and a search output unit configured to output a searching result for the searching. The relationship object may indicate a relationship, which has been previously defined on the SOI DB, between the received space object SOI and a space object SOI related to the received space object SOI among the plurality of space object SOIs.

The searching may set the received space object SOI and an SOI connected to the received space object SOI as the selected relationship object to a searching range for the search word.

The relationship display unit may output the at least one relationship object in a list form or represent the at least one relationship object and the space object SOI connected to the received space object SOI by the at least one relationship object as a relationship graph structure on the basis of the received space object SOI.

In accordance with yet another aspect of the present invention, the search processing unit selects only results in which the result of the keyword search is included in the subject of search and transmits the results to the search output unit.

DESCRIPTION OF REFERENCE NUMERALS OF PRINCIPAL ELEMENTS IN THE DRAWINGS

310: search input unit
320: search output unit
330: search processing unit
340: SOI DB

DESCRIPTION OF EMBODIMENTS

Hereinafter, some embodiments of the present invention will be described in detail with reference to the accompanying drawings. It is to be noted that in assigning reference numerals to respective constituent elements in the drawings, the same reference numerals designate the same constituent elements throughout the drawings although the constituent elements are shown in different drawings. Furthermore, in describing the present invention, a detailed description of the known functions and constructions will be omitted if it is deemed to make the gist of the present invention unnecessarily vague.

Figure 2:
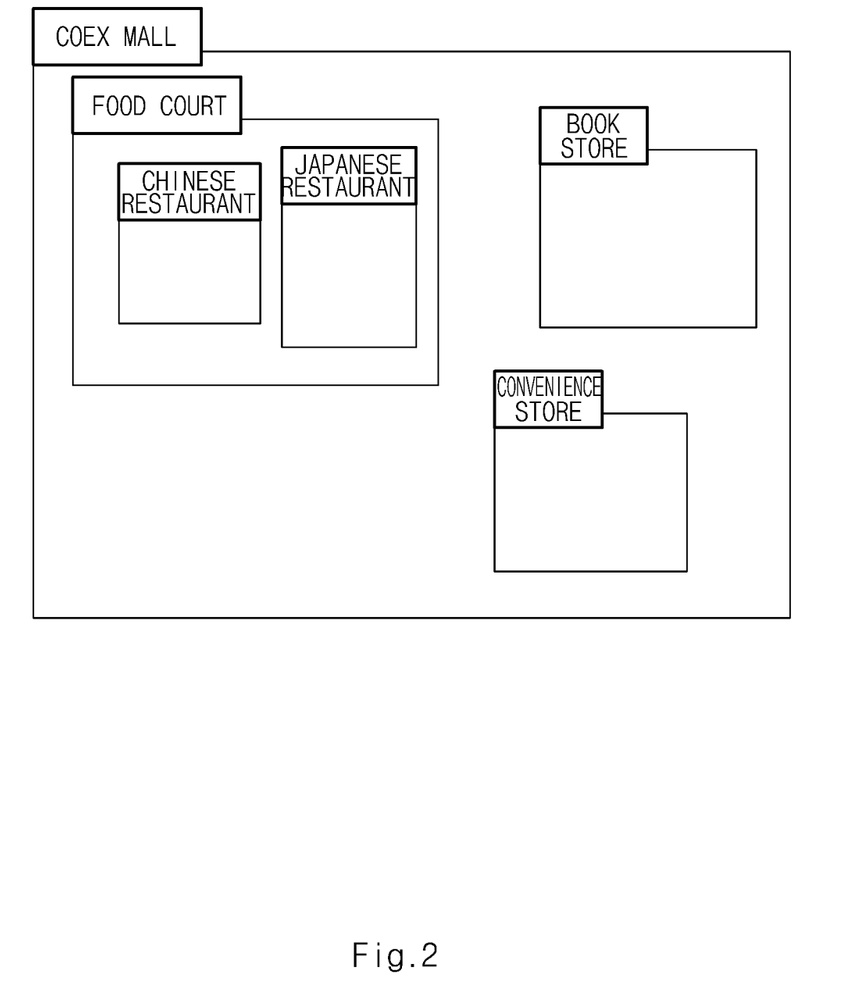
FIG. 2 is a diagram showing the common structure of a space object according to the present invention.

FIG. 2 is a diagram showing the common structure of a space object according to the present invention.

A food court, a book store, and a convenience store exist within Coex Mall, and a Chinese restaurant and a Japanese restaurant exist within the food court. A space object SOI according to the present invention accurately represents and manages the layer of a vertical/horizontal structure of this space in the form of a relationship. Coex Mall is defined as an upper level SOI, and the food court, the book store, and the convenience store (i.e., the down-one-level SOIs of Coex Mall) exist in the form of a vertical structure. Furthermore, the Chinese restaurant and the Japanese restaurant (i.e., the lowest level SOIs) exist within the food court that is the down-one-level SOI of Coex Mall.

Although simply shown for convenience of description, one space object is defined in the form of a hierarchical organization relationship and managed. Accordingly, in the present invention, pieces of information about lower level SOIs included in a specific space can be searched for by limiting a specific space object SOI itself or limiting the space including a plurality of SOIs.

Figure 3:
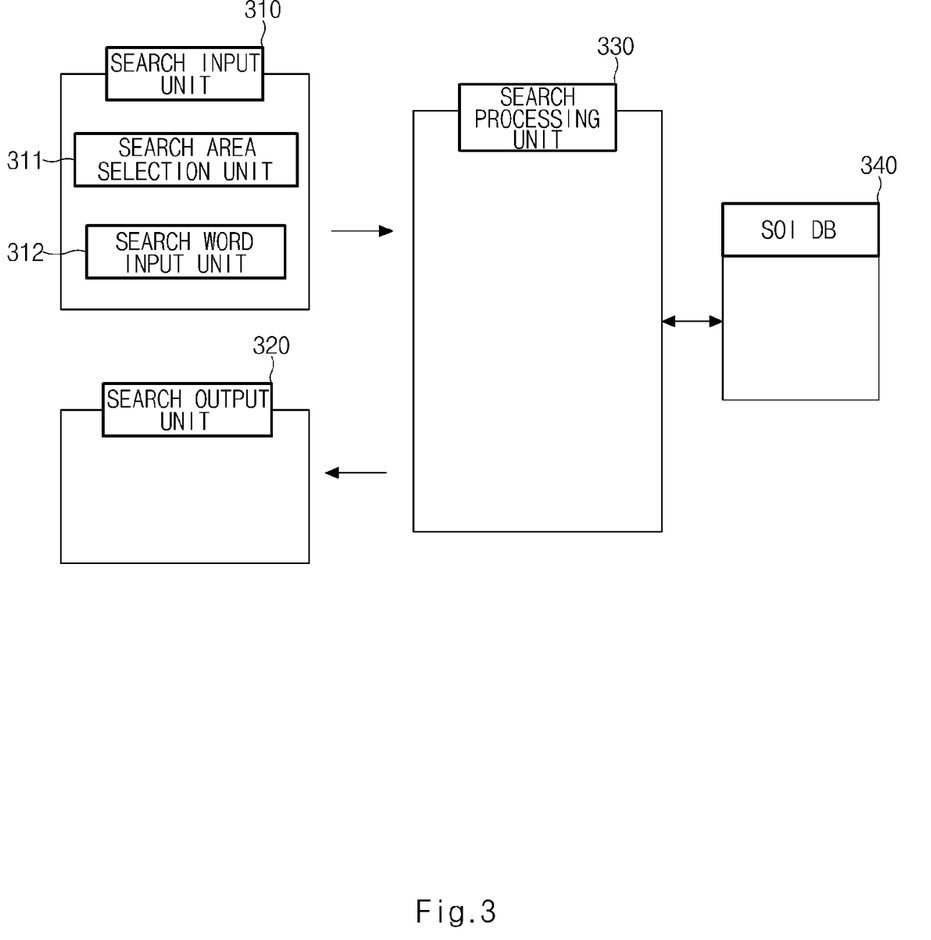
FIG. 3 is a block diagram of an apparatus for searching for position information within an SOI according to an embodiment of the present invention.

FIG. 3 is a block diagram of an apparatus for searching for position information within an SOI according to an embodiment of the present invention. The apparatus for searching for position information according to the present invention chiefly includes a search input unit 310, a search output unit 320, a search processing unit 330, and an SOI DB 340.

The search input unit 310 includes an interface enabling a user to select a specific space object and to make a search. The search input unit 310 further includes a search area selection unit 311 and a search word input unit 312. The search area selection unit 311 enables a user to select a specific space object. As a detailed example, there is a method in which an SOI map displaying space object SOIs on a map is presented to a user and the user individually selects an SOI to be selected as a search range in the SOI map. In some embodiments, a function of selecting a specific space area in the SOI map may also be provided. Furthermore, the search word input unit 312 functions to receive a search word to be searched for within the space object SOI selected in the search area selection unit 311.

The search output unit 320 functions to display the result that the search processing unit 330 analyzes a search condition requested by the search input unit 310 and searches the SOI DB 340 to a user. The search output unit 320 will be described in detail later.

The search processing unit 330 receives a specific SOI, corresponding to a search range, and a search word from the search input unit 310 and defines a range of the specific SOI on the basis of the specific SOI and the search word. As described with reference to FIG. 2, an upper level SOI and a lower level SOI basically have a hierarchical relationship. Pieces of information including the hierarchical relationship are stored in the SOI DB 340.

When an SOI of a search range is received, the search processing unit 330 first sets lower level SOIs of the SOI as the subject of search while operating in conjunction with the SOI DB 340.

Next, the search processing unit 330 performs a keyword search for a search word received from the search input unit 310 by using a common search engine and checks whether the result of the keyword search overlap with the SOI of the subject of search and lower level SOIs of the SOI of the subject of search.

Next, the search processing unit 33 determines a suitable search result only within the overlapping range and transfers the suitable search result to the search output unit 320.

Figure 4:
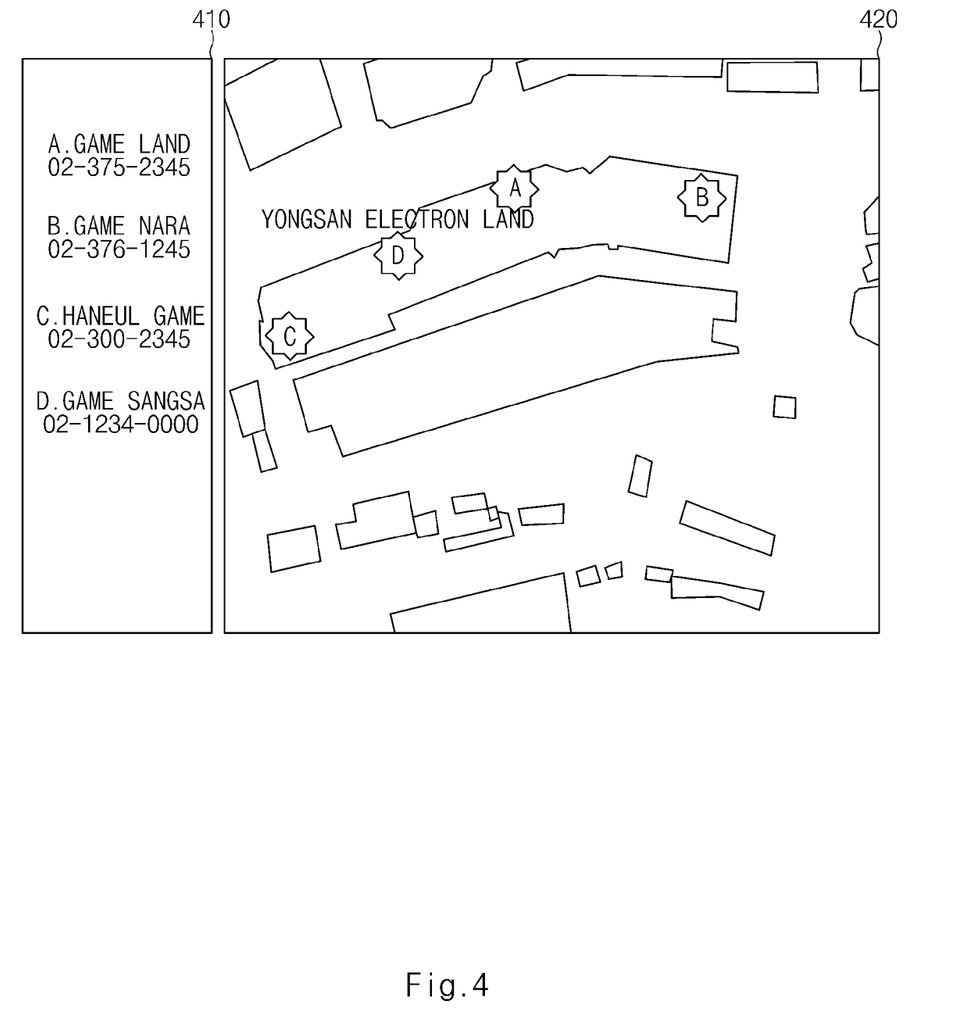
FIG. 4 is a screen showing the final search result provided from a search output unit 320 to a user.

FIG. 4 is a screen showing the final search result provided from the search output unit 320 to a user.

For example, when a user selects a space object SOI "electron land" through the search input unit 310 and enters a search keyword "game machine", the result of search may be displayed as in FIG. 4.

The search result may include a detailed information display unit 410 and an SOI display map 420. The detailed information display unit 410 may display rough information and detailed information about enterprises that sell game machines within the electron land. In accordance with the present invention, the displayed enterprises have object characteristics as lower level SOIs. Accordingly, the displayed enterprises may be further selected, and additional search for the displayed enterprises may be performed.

Furthermore, game machine seller information as the search result is displayed in the SOI display map 420 of the map, and the user may select an SOI object of each game selling enterprise in order to receive additional information.

In this case, pieces of SOI information for lower level SOIs having a hierarchical structure may be further provided. Here, if there is the lowest level SOI having a hierarchical structure for the lower level SOIs, a search can be sequentially made up to the lowest level SOI.

Hereinafter, another method of setting a searching range and performing search for a space object SOI will be described with reference to FIGS. 5 to 11.

Figure 5:
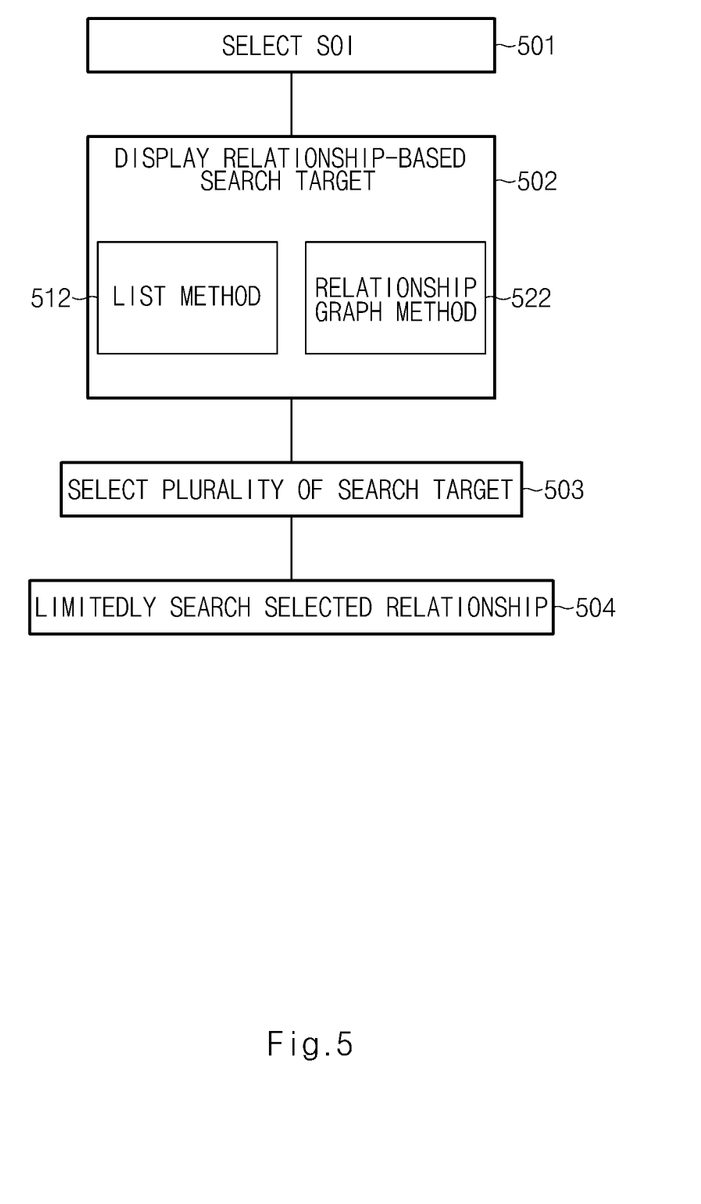
FIG. 5 is a flowchart according to another embodiment of the present invention.

FIG. 5 is a flowchart according to another embodiment of the present invention in a user point of view. In the embodiment, the SOI DB includes a plurality of space object SOIs as well as a relationship object defining between SOIs.

In step S501, a user selects an SOI object. The SOI object is an SOI object displayed on a location information searching apparatus and may be an object such as a building indicated on a map.

In step S502, when the SOI object is specified, a search target related to the specified SOI is displayed. The search target is displayed based on relationship between an object as the search target and the specific SOI. Two methods of a list method 512 and a relationship graph method 522 are illustrative as the display method, but the methods may be combined and the display method of the present invention is not limited thereto. Although to be described later, while the list method 512 displays a list for relationship objects related to the specific SOI, the relationship graph method displays a relationship object and other SOIs connected to the specific SOI as relationship objects.

In step S503, the user selects the displayed relationship object. At this time, the user may select two or more relationship objects.

In step S504, searching for a searching word input by the user is performed. In the searching, the SOI object specified by the user in step S501 and SOIs (indirectly selected) connected to the SOI object specified by the relationship object selected by the user in step S503 are set to a search range.

The searching in another embodiment is discriminated from the searching in a result or a lower region searching in the related art. The above-described searching may be directly performed by selecting a specific SOI on a map without an initial searching result. Further, after first receiving a searching result by a searching word (first searching), even when a searching (second searching) according the above-described method is performed by selecting the specific SOI included in the searching result, a search range of the second searching or the searching result according to the second searching is not limited to the range of the searching result of the first searching.

This method is also discriminated from a method of performing searching on a lower region, that is, a lower level SOI included in the specific SOI. This is because when the specific SOI is selected, relationship objects all for the specific SOI defined on the SOI DB are displayed and the user may select any one of the relationship objects (that is, the relationship selectable by the user is not limited to the lower level SOI).

Figure 6:
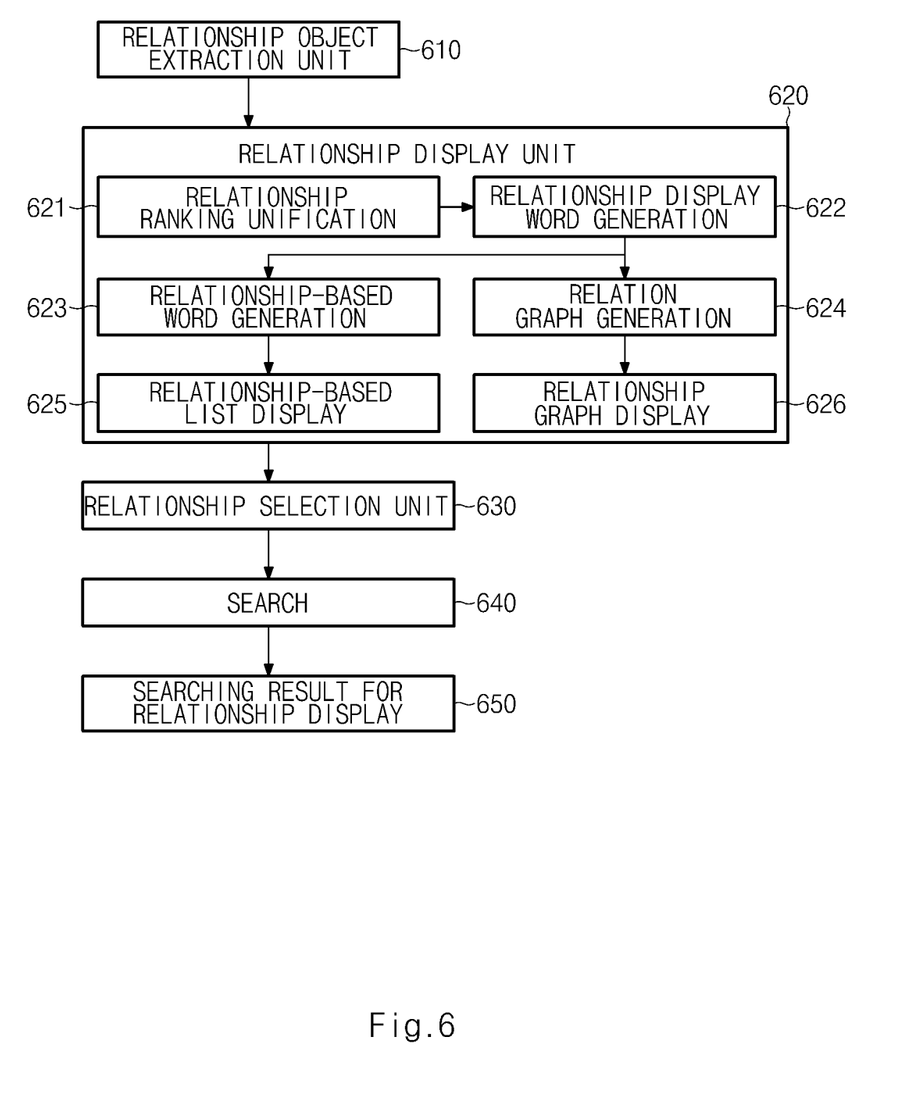
FIG. 6 is a flowchart according to another embodiment of the present invention.

FIG. 6 is a flowchart according to another embodiment in a device point of view. Referring to FIG. 6, the device according to another embodiment may include a relationship object extraction unit 610, a relationship display unit 620, and a relationship selection unit 630 to process searching for a space object SOI. Components illustrated in FIG. 6 may correspond to the components illustrated in FIG. 3 according to functions thereof. For example, the relationship display unit 620 may correspond to the search input unit 310 and the relationship selection unit 630 may correspond to the search input unit 310 or the search area selection unit 311. Further, FIG. 6 illustrates stepwise processes performed in the present invention and thus some essential components in the device (for example, SOI DB) are not illustrated.

When an input for selecting a specific SOI is received from the user, the relationship extraction unit 610 extracts a relationship object related to the specific SOI from the SOI DB. The relationship extraction unit 610 may also extract other SOI objects connected to the specific SOI as a relationship object in addition to the relationship object.

The relationship display unit 620 first determines an order of the relationships (relationship ranking unification) (S621) and then generates relationship display word (S622). The relationship word denotes a word defining relationship between SOI objects and may have been previously defined in the relationship object. The processes may be specially used to output the relation objects in a list form (when the relation objects are output in a relationship graph structure, connection relationships between SOI subjects may be displayed and selected by the user without definition of word defining the relationship between the SOI objects.). The list generation criterion may include (1) physical relationship (locations inside a building, and the like), (2) a selection log by the relationship, (3) a physical distance, (4) commercial relationship, (5) relationship popularity, (6) space popularity, or a combination thereof.

When the relationships are output in a list form, the relationship display unit 620 generates a relationship-relationship object list (S623) and display the list on a screen of the device (S625). When the relationships are output in a relationship graph structure, the relationship display unit generates a relationship graph based on the specific SOI using the relationship objects and the SOI objects connected as the relationship objects (S624) and displays the generated relationship graph on the screen of the device (S626).

The relationship selection unit 630 receives a selection for a portion of the displayed relationship objects.

Then, the controller, for example, a component such as the search processing unit 330 performs searching on the SOI DB based on the specific SOI, the selected relationship object, and a search word to be searched (S640). The search range in the SOI DB may be limited as described with reference to FIG. 5.

Finally, the searching result is displayed in a display unit of the device such as the search output unit 320 (or the relationship display unit) (S650). The displayed result may be aligned according to the relationships and then output.

Figure 7:
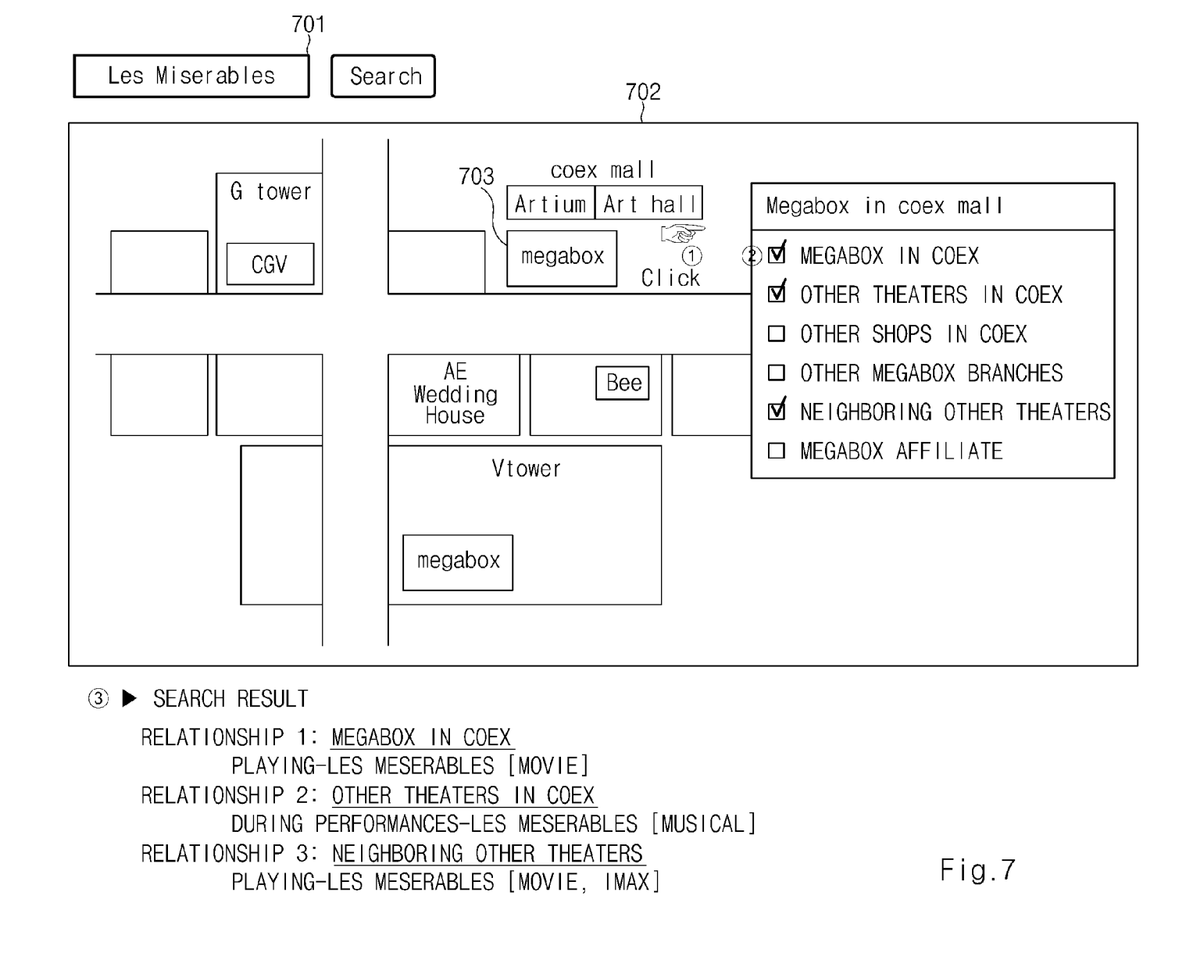
FIG. 7 is a view illustrating a method of outputting a relationship object in a list form according to another embodiment of the present invention.

FIG. 7 illustrates a method of outputting relationship objects in a list form according to another embodiment of the present invention. Referring to FIG. 7, when a MEGABOX SOI object 703 inside COEX MALL is selected by the user on a displayed map screen 702, relationship objects corresponding to the MEGABOX SOI are displayed in a list form. In the exemplary embodiment, the relationship object list includes "MEGABOX in COEX", "other theaters in COEX", "other shops in COEX", "other MEGABOX branches", "neighboring other theaters", and "MEGABOX affiliates". Then, relationship objects indicating the relationship of some relationship objects among the relationship object list, for example, "MEGABOX in COEX", "other theaters in COEX", and "neighboring other theaters" are selected. Subsequently, when a search word, for example, "Les Miserables" is input on a search window 701 and then searching is performed, the selected relationship objects, that is, searching results related to "MEGABOX in COEX", "other theaters in COEX", and "neighboring other theaters" are derived. The searching results may be aligned according to the relationships (relationship objects). In this case, the result for a movie playing "Les Miserables" may be provided to the user with respect to the relationship 1, that is, "MEGABOX in COEX", the result for a musical playing "Les Miserables" may be provided to the user with respect to the relationship 2, that is, "other theaters in COEX", and finally, the result for a 'movie' "Les Miserables" playing in 'IMAX' may be provided to the user with respect to the relationship 3, that is, "neighboring other theaters".

In summary, the MEGABOX SOI 703 in COEX is selected, display words of the defined relationship objects are listed in a list in order generated. The relationship objects of which titles/display words of the relationship objects, and the like are not defined are excluded from targets displayed in the list (but, displayed in the relationship graph structure). When one or more relationship objects (relationship display words) as targets to be searched are selected, the searching is performed only on the selected relationship. The searching results may be classified and displayed according to the relationships.

Figure 8:
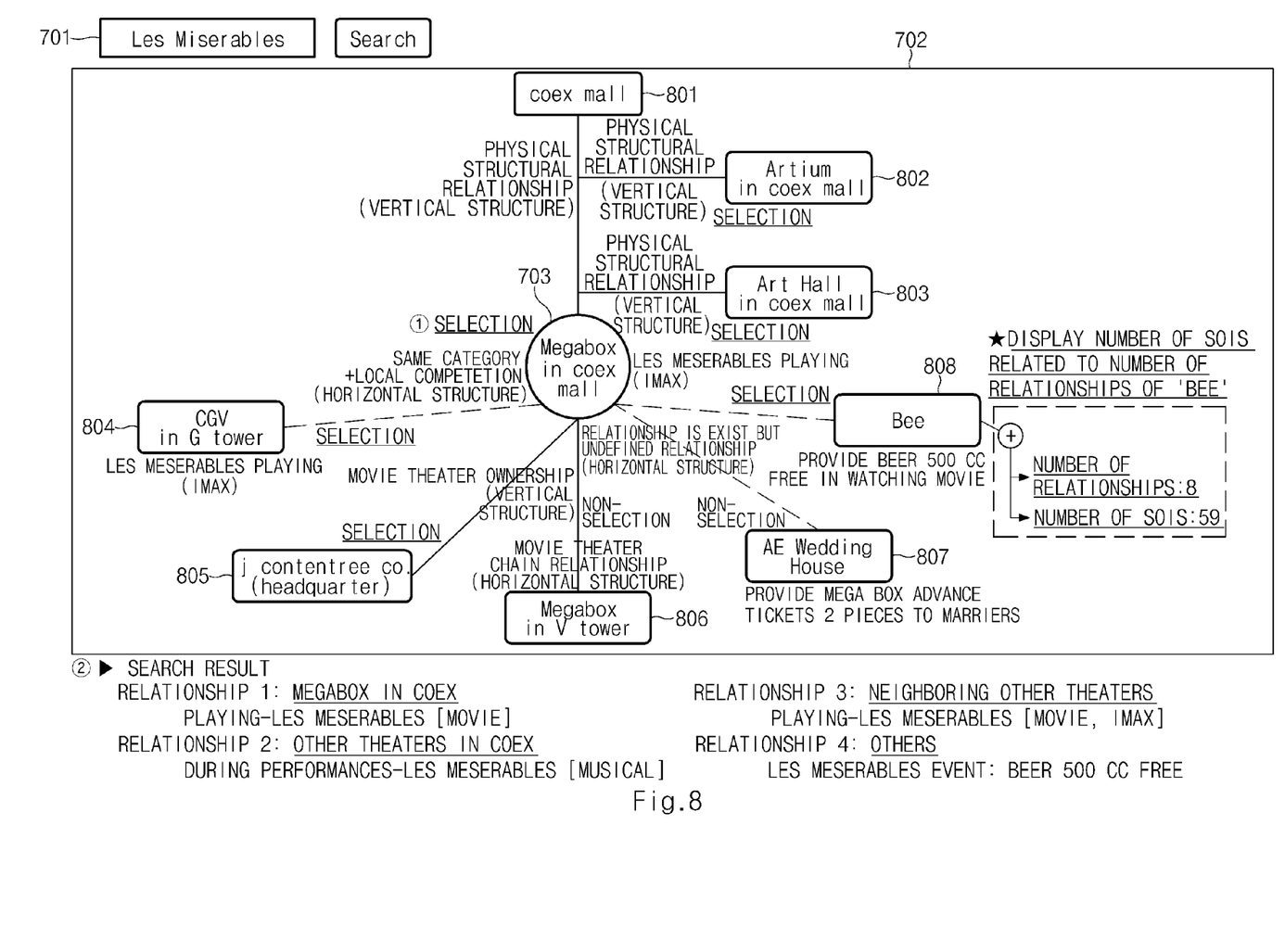
FIG. 8 is a view illustrating a method of outputting a relationship object in a relationship graph structure according to anther embodiment of the present invention.

FIG. 8 illustrates a method of outputting relationship objects in a relationship graph structure according to another embodiment of the present invention. Referring to FIG. 8, when the MEGABOX object 703 in COEX MALL is selected by the user, relationship objects related to the selected SOI object 703 and the SOI objects 801, 802, ..., 808 related to the relationship objects are displayed.

For example, the COEX MALL SOI object 801 has a vertical relationship structure with a MEGABOX SOI object 703, an ARTIUM SOI object 802, and an ART HALL SOI object 803. That is, the MEGABOX SOI object 703, the ARTIUM SOI object 802, and the ART HALL SOI object 803 correspond to a lower level SOI of the COEX MALL SOI 801 and buildings/spaces corresponding to the respective SOIs are included in COEX MALL.

The BEE SOI subject 808 is mutually associated with the MEGABOX SOI object 703 as the relationship object, but the relationships thereof are not defined. In this case, the BEE SOI object 808 and MEGABOX SOI object 703 may be connected to a dotted line or a solid line without the display word indicating the relationship object. Further, the BEE SOI object 808 may additionally provides information for the number of relationship objects (the number of relationships: 8) related thereto and the number of SOI objects (the number of SOI: 59) connected by the relationship objects. The information may be used additional searching for the BEE SOI object 808. For example, the BEE SOI object 808 may display the number of relationship objects included in the BEE SOI object 808 and the number of SOIs firstly related regardless of the initially selected MEGABOX SOI object 703 and when the number of corresponding relationship objects/the number of related SOIs is selected, a list or a graph may be displayed on the basis of the BEE SOI objects 808.

Subsequently, "vertical structure", "same category+local competition", "movie theater ownership", and the connection relationship with the undefined BEE SOI object 808 are selected among the relationship objects connected to the MEGABOX SOI object 703 by the user. When the searching is performed on the search word "Les Miserables" input on the search window 701, the range in performing the search of the corresponding searching may be objects connected to the MEGABOX SOI object 703 by the selected connection relationship (relationship object), that is, the COEX MALL SOI 801, the ARTIUM SOI 802, the ART HALL SOI 803, a CGB in G Tower SOI 804, a J Contentree co. SOI 805, and the BEE SOI 808. The searching results for the corresponding SOI objects may be represented according to the relationships and the searching results for the objects of which the relationships are not defined may be provided as an "others" item. In the example illustrated in FIG. 8, HOF 'BEE' provides free beer 500CC as a screening event.

Figure 9A:
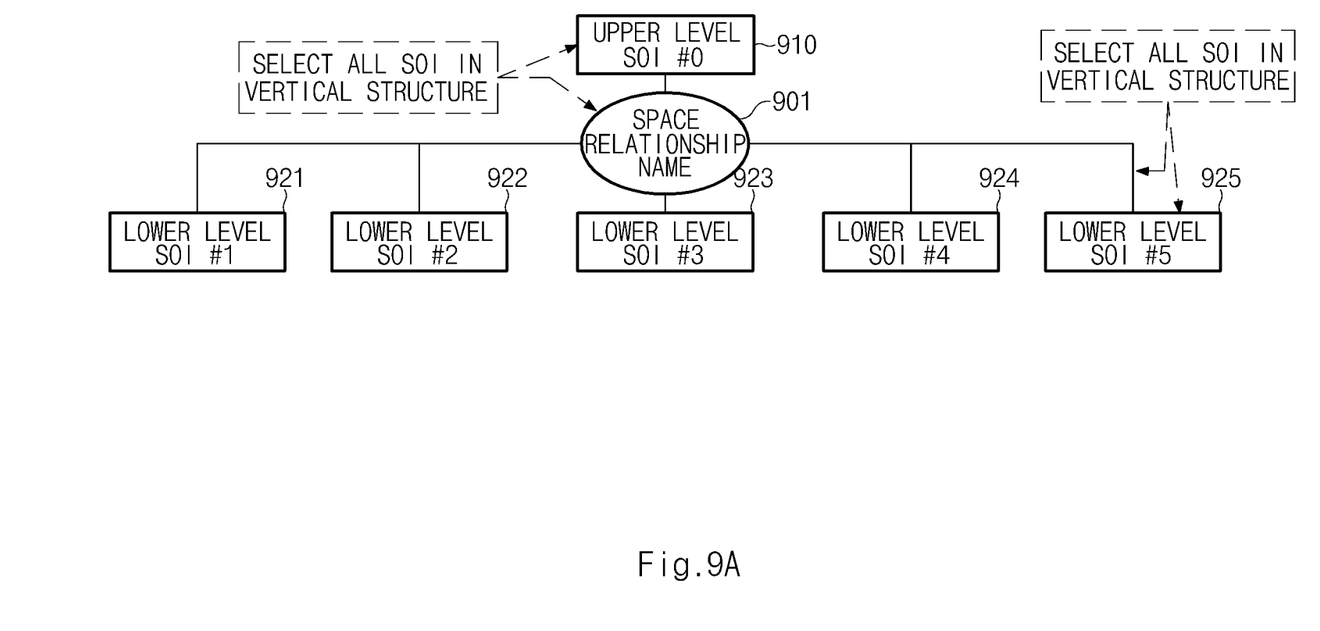
FIGS. 9A and 9B views illustrating a vertical structure and a horizontal structure between SOIs.
Figure 9B:
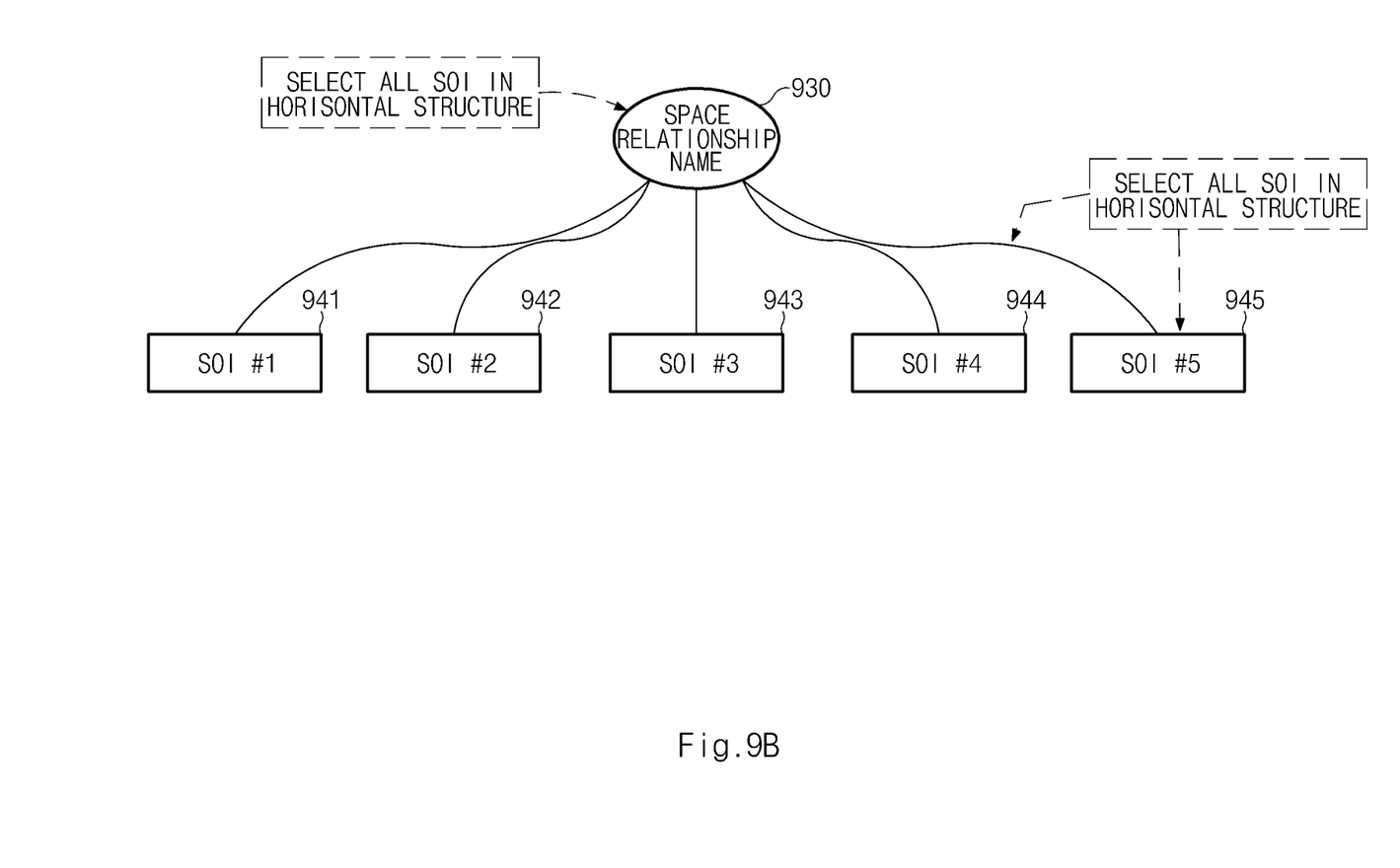

FIGS. 9A and 9B illustrate a vertical structure and horizontal structure between SOIs. FIG. 9A illustrates a vertical structure. The vertical structure includes an upper level SOI 910 and a plurality of lower level SOI 921, 922, 923, 924, and 825. The upper level SOI and the lower level SOIs may be connected as a first relationship object represented as a space relationship name 901. The relationship name may define relationship between the upper level SOI and the lower level SOI and the information for the relationship name may be included in the first relationship object.

Subsequently, when the first relationship object or the upper level SOI 910 is selected by the user, all the SOIs included in the vertical structure are selected. However, on the assumption that other SOIs (second lower level SOIs) connected to the lower level SOI are exist, the entire SOI selected by selection of the first relationship object or the upper level SOI 910 may not include second lower level SOIs indirectly connected. An individual lower SOI may be selected by selecting a structural line connected between the lower level SOIs or between each of the lower level SOIs and the space relationship 901.

FIG. 9B illustrates a horizontal structure. Referring to FIG. 9B, SOIs 941, 942, 943, 944, and 945 may be connected as a second relationship object represented by a space relationship name 930 defining the horizontal structure. The space relationship name 930 may define common relationship between SOIs and the entire SOIs in the horizontal structure may be selected through selection of the space relationship name 930. The individual SOI selection method is the same as described in the vertical structure.

Figure 10:
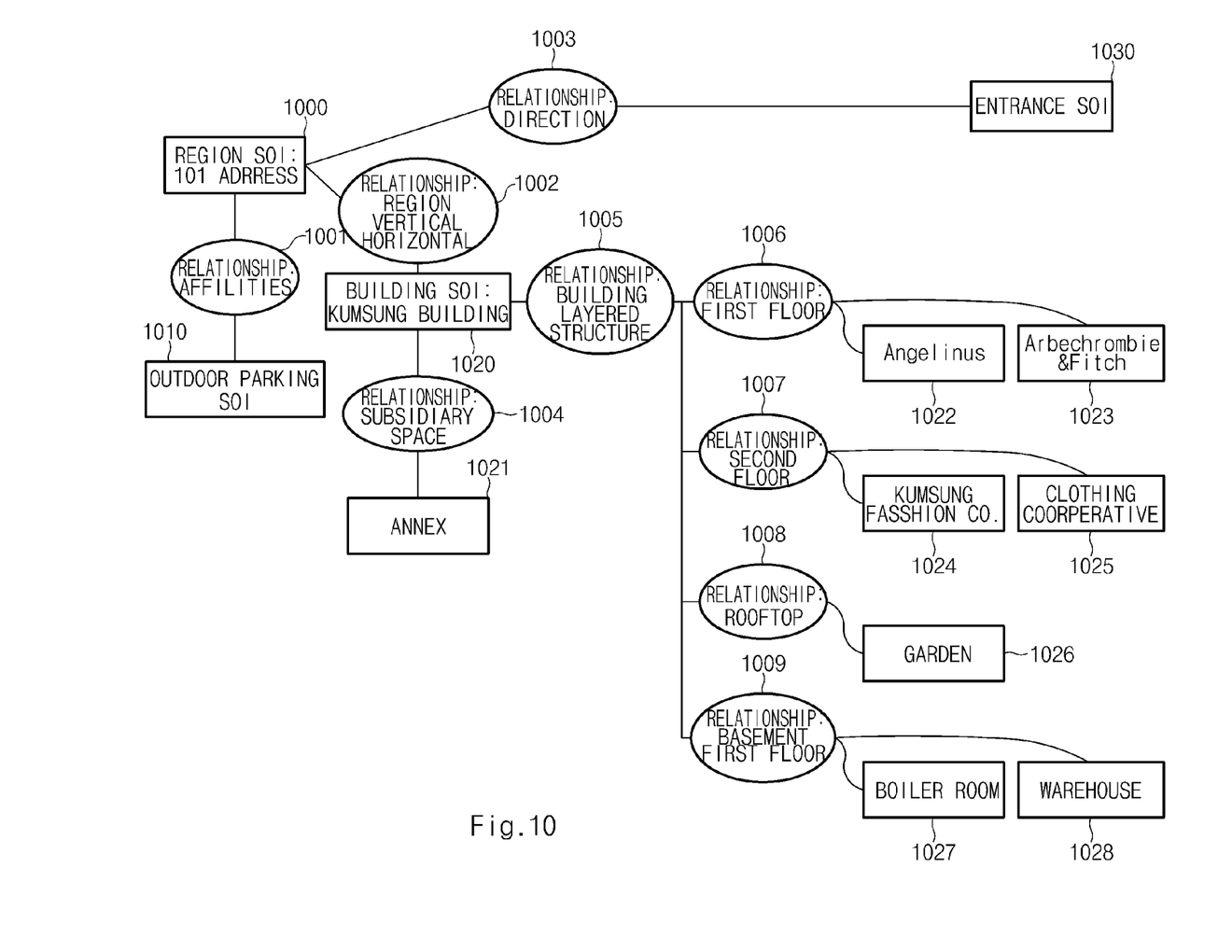
FIG. 10 is a view illustrating a structure between SOIs including a vertical structure, a horizontal structure, and a layered structure.

FIG. 10 illustrates a structure between SOIs including a vertical structure, a horizontal structure, and a layered structure. Referring to FIG. 10, a region SOI 1000 indicating 101 address is connected to a outdoor parking SOI 1010 as a facilities relationship 1001, connected to a building SOI 1020 indicating a KUMSUNG building as a region vertical structure relationship 1020, and connected to an entrance SOI 1030 as a direction relationship 103. Further, the KUMSUNG building SOI 1020 is connected to an annex SOI 1021 as a subordinate space relationship 1004. All 'relationships' in the description of FIG. 10 may be replaced with 'relationship object'.

The KUMSUNG building SOI 1020 includes a layered structure. The layered structure defines structures of floors constituting a building and indicated as a building floored structure relationship 1005. Further, the building floored structure relationship 1005 includes relationships indicating respective floors of the building 1006, 1007, 1008, and 1009. The relationships indicating the floors, for example, a first floor relationship 1006 is connected to an ANGELINUS SOI 1022 and an ARBECHROMBIE & FITCH SOI 1023, for example, as a horizontal structure in the embodiment.

Figure 11A:
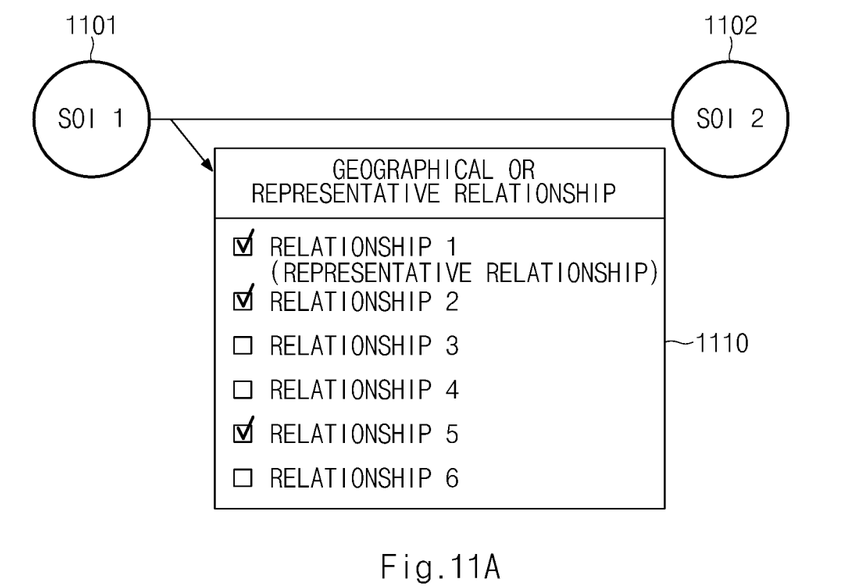
FIGS. 11A and 11B are illustrative views illustrating a method of representing a plurality of relationship objects existing between two SOIs.
Figure 11B:
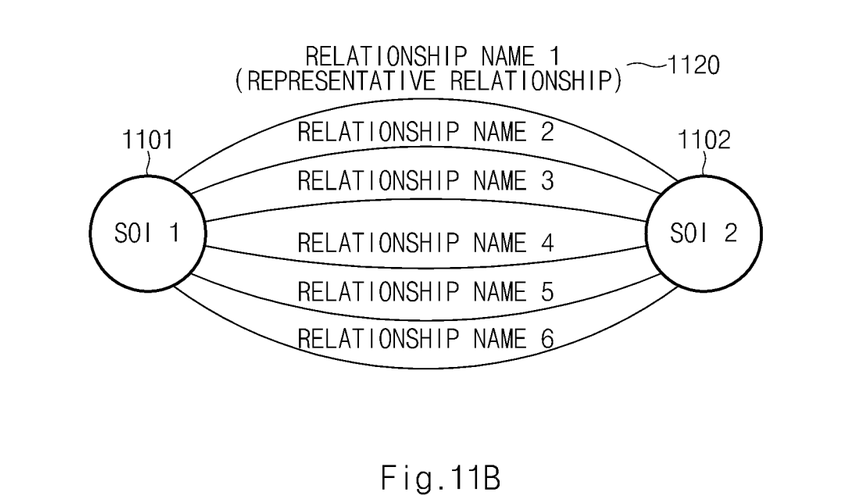

FIGS. 11A and 11B illustrate examples of a representation method for a plurality of relationship objects existing between two SOI objects. Referring to FIG. 11A, when a plurality of relationship objects between a first SOI object 1101 and a second SOI object 1102 are exist, the plurality of relationship objects are displayed as one linear relationship. When the linear relationship is selected, a list 1110 for the plurality of relationship objects may be displayed. At this time, representative relationship (that is, relationship 1) may be positioned in an uppermost of a list by setting geographic or representative relationship between the two SOIs as a title.

Unlike the example of FIG. 11A, linear relationships 1120 corresponding to the plurality of relationship objects existing between two SOI object may be displayed as illustrated in FIG. 11B. At this time, the respective linear relationship all may be selected.

In accordance with the present invention, the accuracy of a search can be increased because a user can make a search by limiting a range of the search for a desired SOI object.

Furthermore, the present invention can solve the limitation of a POI search in which a range of space desired by a user cannot be arbitrarily designated because the present invention is not based on a POI represented by only simple X/Y coordinate points and the present invention targets an SOI object including a space concept having a specific area form.

Further, the present invention can set a search range based not on an SOI inside or an SOI outside but on the relationship of SOI object through definition of selectable relationship objects.

The apparatus and method for searching for position information may be implemented in the form of program commands which can be executed by computer means and may be stored in a computer-readable medium. The computer-readable medium may comprise program commands, data files, data structures, etc. solely or in combination. Meanwhile, the program commands recorded on the recording medium may be specially designed and configured for the present invention or may be known to a person having ordinary skill in the computer software.

The computer-readable recording medium may include, for example, magnetic media such as a hard disk, a floppy disk, and a magnetic tape, optical media such as CD-ROM and DVD, magneto-optical media such as a floptical disk, and hardware devices such as ROM, RAM, and flash memory which are specially configured to store and execute program commands. Meanwhile, the recording medium may be a transmission medium, such as an optical or metal line and a waveguide, including carriers for transmitting a signal to designate a program command or a data structure.

Furthermore, the program commands may include, for example, not only machine codes produced by a compiler, but also high-level language codes executable by a computer using an interpreter. The hardware device may be configured to be operated as one or more software modules in order to perform the operation of the present invention, and the inverse is the same.

Meanwhile, those having ordinary skill in the art to which the present invention pertains will appreciate that the present invention may be implemented in other detailed forms without changing the technical spirit or indispensable characteristics.

Accordingly, it should be understood that the above-described embodiments are only illustrative from all aspects and are not to be restrictive. The scope of the present invention is defined by the following claims rather than the detailed description, and the meanings and scope of the claims and all changes or modified forms induced from their equivalents should be interpreted to fall within the scope of the present invention.

SYMBOL OF EACH OF THE ELEMENTS IN THE FIGURES

[FIG. 3]
310: Search input unit
311: Search area selection unit
312: Search word input unit
320: Search output unit
330: Search processing unit
[FIG. 5]
501: SELECT SOI
502: DISPLAY RELATIONSHIP-BASED SEARCH TARGET
512: LIST METHOD
522: RELATIONSHIP GRAPH METHOD
503: SELECT PLURALITY OF SEARCH TARGET
504: LIMITEDLY SEARCH SELECTED RELATIONSHIP
[FIG. 6]
610: RELATIONSHIP OBJECT EXTRACTION UNIT
620: RELATIONSHIP DISPLAY UNIT
621: RELATIONSHIP RANKING UNIFICATION
622: RELATIONSHIP DISPLAY WORD GENERATION
623: RELATIONSHIP-BASED LIST GENERATION
624: RELATION GRAPH GENERATION
625: RELATIONSHIP-BASED LIST DISPLAY
626: RELATIONSHIP GRAPH DISPLAY
630: RELATIONSHIP SELECTION UNIT
640: SEARCH
650: SEARCHING RESULT FOR RELATIONSHIP DISPLAY
[FIG. 9A]
910: UPPER LEVEL SOI
901: SPACE RELATIONSHIP NAME
902-925: LOWER LEVEL SOI
[FIG. 9B]
930: SPACE RELATIONSHIP NAME
[FIG. 10]
1000: REGION SOI: 101 ADRRESS
1001: RELATIONSHIP: AFFILITIES
1002: RELATIONSHIP: REGION VERTICAL HORIZONTAL
1003: RELATIONSHIP: DIRECTION
1004: RELATIONSHIP: SUBSIDIARY SPACE
1005: RELATIONSHIP: BUILDING LAYERED STRUCTURE
1006: RELATIONSHIP: FIRST FLOOR
1007: RELATIONSHIP: SECOND FLOOR
1008: RELATIONSHIP: ROOFTOP
1009: RELATIONSHIP: BASEMENT FIRST FLOOR
1010: OUTDOOR PARKING SOI
1020: BUILDING SOI: KUMSUNG BUILDING
1021: ANNEX
1024: KUMSUNG FASSHION CO.
1025: CLOTHING COORPERATIVE
1026: GARDEN
1027: BOILER ROOM
1028: WAREHOUSE
1030: ENTRANCE SOI

What is claimed is:

1. An apparatus comprising a non-transitory storage medium storing a software module for searching for position information, the software module comprising:
a Space Of Interest (SOI) data base (DB) including a plurality of space object SOIs and relationship objects;
a search input unit configured to receive at least one of the plurality of space object SOIs and a search word from a user;
a relationship display unit configured to output at least one relationship object with respect to the received at least one space object SOI;
a relationship selection unit configured to receive a selection for a portion of the output relationship objects from the user;
a search processing unit configured to perform searching on the SOI DB based on the selected relationship object, the received space object SOI, and a search word; and
a search output unit configured to output a searching result for the searching,
wherein the relationship object indicates a relationship, which has been previously defined on the SOI DB, between the received space object SOI and a space object SOI related to the received space object SOI among the plurality of space object SOIs~
wherein the relationship display unit represents at least one relationship object and the space object SOI connected to the received space object SOI by the at least one relationship object in a relationship graph structure on the basis of the received space object SOI, and wherein when information for a relationship object included in the specific SOI in the relationship graph structure and a related SOI is selected, the relationship graph structure is again displayed on the basis of the specific SOI.

2. The apparatus according to claim 1, wherein the searching sets the received space object SOI and a space object SOI connected to the received space object SOI as the selected relationship object to a searching range for the search word.

3. The apparatus according to claim 1, wherein the relationship display unit outputs the at least one relationship object as a list form.

4. The apparatus according to claim 3, wherein ranks of the relationship object included in the list is determined according to a preset generation criterion and the list is output in order of the ranks.

5. The apparatus according to claim 1, wherein the relationship graph structure includes a vertical structure including an upper level space object SOI, at least one lower level space object SOI, and a first relationship object defining relationship between the an upper level space object SOI and the at least one lower level space object SOI, when the upper level space object SOI or the first relationship object is selected, both the upper level space object SOI and at least one lower level space object SOI are selected.

6. The apparatus according to claim 1, wherein the relationship graph structure includes a horizontal structure including at least two space object SOIs and a second relationship object defining common relationship for the at least two space object SOIs, when the second relationship object is selected, the at least two space object SOIs are selected.

7. The apparatus according to claim 1, wherein the relationship graph structure includes a layered structure and the layered structure includes a building SOI, a third relationship object defining structures of floors constituting the building SOI, a relationship object defining the floors constituting the building, and individual SOIs included in the respective floors.

8. The apparatus according to claim 7, wherein all SOI objects constituting the building SOI are selected when the third relationship object is selected and entire individual SOIs included in the respective floors when the relationship objects defining the respective floors are selected.

9. The apparatus according to claim 1, wherein when a plurality of relationship objects are exist between the received space object SOI and the space object SOI connected to the received space object SOI, the plurality of relationship objects are indicated as one linear relationship and when the linear relationship is selected, a list for the plurality of relationship objects is displayed.

10. The apparatus according to claim 1, wherein when a plurality of relationship objects are exist between the received space object SOI and the space object SOI connected to the received space object SOI, a plurality of linear relationship for the plurality of relationship objects are indicated and the plurality of displayed linear relationships are selectable.

11. The apparatus according to claim 1, wherein the relationship output unit classify the searching results according to the selected relationship object and outputs a classifying result.

* * * * *